(12) United States Patent
Yagishita et al.

(10) Patent No.: US 8,765,631 B2
(45) Date of Patent: Jul. 1, 2014

(54) CERIUM OXIDE-ZIRCONIUM OXIDE COMPOSITE OXIDE AND METHOD FOR PRODUCING THE SAME

(75) Inventors: Sadahiro Yagishita, Osaka (JP); Noriyuki Omura, Osaka (JP); Akiko Tatsumi, Osaka (JP)

(73) Assignee: Daiichi Kigenso Kagaku Kogyo Co., Ltd., Osaka-shi (JP)

( * ) Notice: Subject to any disclaimer, the term of this patent is extended or adjusted under 35 U.S.C. 154(b) by 0 days.

(21) Appl. No.: 13/577,375

(22) PCT Filed: Feb. 25, 2011

(86) PCT No.: PCT/JP2011/054309
§ 371 (c)(1),
(2), (4) Date: Aug. 6, 2012

(87) PCT Pub. No.: WO2011/108457
PCT Pub. Date: Sep. 9, 2011

(65) Prior Publication Data
US 2012/0309616 A1 Dec. 6, 2012

(30) Foreign Application Priority Data
Mar. 1, 2010 (JP) .................... 2010-063268

(51) Int. Cl.
*B01J 23/10* (2006.01)
(52) U.S. Cl.
USPC ............................ 502/304; 502/349; 502/439
(58) Field of Classification Search
USPC .................................... 502/304, 439, 349
See application file for complete search history.

(56) References Cited

U.S. PATENT DOCUMENTS

| 8,048,389 B2 * | 11/2011 | Okamoto et al. ............ 423/21.1 |
| 2007/0148072 A1 | 6/2007 | Okamoto et al. |
| 2007/0155624 A1 | 7/2007 | Wakita et al. |

(Continued)

FOREIGN PATENT DOCUMENTS

| CN | 101024513 A | 8/2007 |
| CN | 101124045 A | 2/2008 |

(Continued)

OTHER PUBLICATIONS

International Search Report for PCT/JP2011/054309, mailing date of Jun. 7, 2011.

*Primary Examiner* — Kaj K Olsen
*Assistant Examiner* — Pritesh Darji
(74) *Attorney, Agent, or Firm* — Westerman, Hattori, Daniels & Adrian, LLP

(57) ABSTRACT

The present invention provides a cerium oxide-zirconium oxide based composite oxide that has a large OSC at a low temperature and that has a suitable OSC, and a method for readily producing the composite oxide. Specifically, the present invention provides a cerium oxide-zirconium oxide based composite oxide comprising a mixture of (1) a cerium-zirconium composite oxide from a melting process and (2) cerium dioxide from a wet process, and a method for producing a cerium oxide-zirconium oxide based composite oxide, the method comprising dispersing a cerium-zirconium composite oxide from a melting process in a cerium-containing solution, neutralizing the resulting dispersion; and then performing a heat treatment.

10 Claims, 4 Drawing Sheets

(56) References Cited

U.S. PATENT DOCUMENTS

| | | |
|---|---|---|
| 2008/0009410 A1 | 1/2008 | Okamoto et al. |
| 2008/0051283 A1 | 2/2008 | Miura |
| 2010/0004123 A1 | 1/2010 | Kimura et al. |
| 2010/0061903 A1 | 3/2010 | Kohara et al. |
| 2011/0071017 A1 | 3/2011 | Okamoto et al. |
| 2011/0113754 A1 | 5/2011 | Kohara et al. |
| 2011/0171092 A1 | 7/2011 | Wakita et al. |

FOREIGN PATENT DOCUMENTS

| | | |
|---|---|---|
| JP | 2005-314134 A | 11/2005 |
| JP | 2008-013423 A | 1/2008 |
| WO | 2005/102523 A1 | 11/2005 |
| WO | 2006/030763 A1 | 3/2006 |
| WO | 2008/004452 A1 | 1/2008 |
| WO | 2008/093471 A1 | 8/2008 |
| WO | 2010/064497 A1 | 6/2010 |

* cited by examiner

CERIUM OXIDE-ZIRCONIUM OXIDE COMPOSITE OXIDE AND METHOD FOR PRODUCING THE SAME

TECHNICAL FIELD

The present invention relates to a cerium oxide-zirconium oxide based composite oxide and a method for producing the same.

BACKGROUND ART

Cerium oxide has an oxidation-reduction potential of as low as about 1.6 V between $Ce^{4+}$ and $Ce^{3+}$, and hence the reaction represented by the formula below proceeds reversibly. For this reason, cerium oxide exhibits an oxygen storage capacity (hereinafter referred to as OSC), and is thus used as a promoter in an automotive three-way catalyst or as a catalyst support.

$$CeO_2 \Leftrightarrow CeO_{2-X} + X/2 O_2 (X=0 \text{ to } 0.5)$$

However, pure cerium oxide is well known for having an extremely low OSC, i.e., X=about 0.005.

To improve this, there have been numerous reports that state that, for example, by forming a solid solution of zirconium oxide in cerium oxide, (1) the heat resistance of the specific surface area of cerium oxide can be improved, and (2) the OSC can be improved by allowing insertion of $Zr^{4+}$ having a small ionic radius into a Ce backbone to alleviate the increase in volume during the above-mentioned reaction.

Patent Literature 1 discloses a cerium/zirconium-base composite oxide containing cerium and zirconium, wherein the composite oxide satisfies requirements that (1) an oxygen release initiation temperature is 380° C. or below, that (2) an oxygen release amount is 485 μmol/g or more, and that (3) an oxygen release amount at 400° C. is 15 μmol/g or more.

This composite oxide containing cerium and zirconium is obtained by mixing a cerium starting material containing cerium oxide and a zirconium starting material containing zirconium oxide at a predetermined mixing ratio; melting the resulting starting material mixture at a temperature at or above the melting point; cooling the melt to form an ingot; grinding the ingot to prepare a powder; then optionally removing strain within powder crystal grains under heating; and grinding to a further fine state. As such, unlike the composite oxides containing cerium and zirconium that can be obtained by a usual wet process, the composite oxide of Patent Literature 1 is obtained by a melting process (dry process), and thus has the above-mentioned unique properties.

Since the mixture is slowly cooled after the melting has been performed once, a final product can be obtained with a good crystallinity and with a large crystallite diameter. When considered based on a particle unit, such an increase in the crystallite diameter indicates that the number of atoms within the structure (i.e., the internal energy) is increased, relative to the number of atoms on the surface (i.e., the surface energy), causing deactivation of the surface. That is, in an energy base, it is in a state where the oxygen in the bulk easily moves, whereas the oxygen in the surface cannot easily move.

The above demonstrates that there is a limitation in improving OSC at a temperature lower than the above.

Patent Literature 2 discloses a cerium oxide-zirconium oxide-based mixed oxide comprising cerium oxide and zirconium oxide, wherein (1) the weight ratio of $CeO_2:ZrO_2$ is 60:40 to 90:10, and (2) the cerium oxide and the zirconium oxide are present as a mixture, the zirconium oxide being composed of a solid solution in which tetragonal or cubic zirconium oxide contains cerium oxide. This composite metal oxide is excellent in platinum dispersibility; however, despite such an advantageous feature, it suffers from an insufficient OSC at a low temperature.

Patent Literature 3 discloses a process for producing a metal oxide particle comprising a core part relatively rich in a ceria-zirconia solid solution and a surface layer relatively rich in a second metal oxide, the process comprising: providing a sol containing at least a population of ceria-zirconia solid solution colloid particles and a population of second metal oxide colloid particles differing in the isoelectric point with each other; adjusting the pH of said sol to be closer to the isoelectric point of said population of ceria-zirconia solid solution colloid particles than to the isoelectric point of said population of second metal oxide colloid particles, thereby aggregating said population of ceria-zirconia solid solution colloid particles; adjusting the pH of said sol to be closer to the isoelectric point of said population of second metal oxide colloid particles than to the isoelectric point of said population of ceria-zirconia solid solution colloid particles, thereby aggregating said population of second metal oxide colloid particles onto said population of ceria-zirconia solid solution colloid particles aggregated; and drying and firing the obtained aggregate. However, this production process requires complicated operations, such as the use of ceria-zirconia solid solution colloid particles and second metal oxide colloid particles. Further, the resulting metal oxide particle suffers from an insufficient OSC at a low temperature.

CITATION LIST

Patent Literature

PTL 1: WO 2006/030763
PTL 2: Japanese Unexamined Patent Publication No. 2008-013423
PTL 3: Japanese Unexamined Patent Publication No. 2005-314134

SUMMARY OF INVENTION

Technical Problem

The present invention is accomplished in view of the above-mentioned problems. An object of the present invention is to provide a cerium oxide-zirconium oxide based composite oxide that has a large OSC at a low temperature and that has a suitable OSC. It is a further object of the present invention to provide a method for readily producing such a composite oxide.

Solution to Problem

The present inventors, etc., conducted extensive research to achieve the above objects, and found that incorporation of a mixture of (1) a cerium-zirconium composite oxide from a melting process and (2) cerium dioxide from a wet process can unexpectedly achieve the production of a cerium oxide-zirconium oxide based surface active composite oxide having a high OSC.

Based on such findings, the present invention provides a cerium oxide-zirconium oxide based composite oxide and a method for producing the cerium oxide-zirconium oxide based composite oxide, as described below.

1. A cerium oxide-zirconium oxide based composite oxide comprising a mixture of (1) a cerium-zirconium composite oxide from a melting process and (2) cerium dioxide from a wet process.

2. The cerium oxide-zirconium oxide based composite oxide according to Item 1, wherein the cerium-zirconium composite oxide from a melting process has a crystallite diameter of 50 nm or greater, and wherein the cerium dioxide from a wet process has a crystallite diameter of less than 50 nm.

3. The cerium oxide-zirconium oxide based composite oxide according to Item 1 or 2, which has an OSC (600° C.) of 150 μmol/g or more.

4. The cerium oxide-zirconium oxide based composite oxide according to any one of Items 1 to 3, which has a weight ratio of (1):(2) of 20 to 99:1 to 80.

5. The cerium oxide-zirconium oxide based composite oxide according to any one of Items 1 to 4, wherein the cerium-zirconium composite oxide from a melting process contains one or more rare earth oxides other than cerium oxide.

6. The cerium oxide-zirconium oxide based composite oxide according to any one of Items 1 to 5, which contains one or more rare earth oxides other than cerium oxide.

7. A method for producing a cerium oxide-zirconium oxide based composite oxide, the method comprising:
 dispersing a cerium-zirconium composite oxide from a melting process in a cerium-containing solution;
 neutralizing the resulting dispersion; and then
 performing a heat treatment.

8. The method for producing a cerium oxide-zirconium oxide based composite oxide according to Item 7, wherein the cerium-containing solution contains one or more rare earth metal salts other than cerium salt.

9. The method for producing a cerium oxide-zirconium oxide based composite oxide according to Item 7 or 8, wherein the cerium-zirconium composite oxide from a melting process has a crystallite diameter of 50 nm or greater.

10. The method for producing a cerium oxide-zirconium oxide based composite oxide according to any one of Items 7 to 9, wherein the cerium-zirconium composite oxide from a melting process contains one or more rare earth oxides other than cerium oxide.

Advantageous Effects of Invention

The present invention can provide a cerium oxide-zirconium oxide based composite oxide that has a high OSC at a low temperature and that has a suitable OSC, and a method for readily producing the cerium oxide-zirconium oxide based composite oxide. The cerium oxide-zirconium oxide based composite oxide of the present invention is desirable for use in the field as a promoter in an automotive three-way catalyst, an OSC material, a catalyst support, or the like.

DESCRIPTION OF EMBODIMENTS

Figure 1:
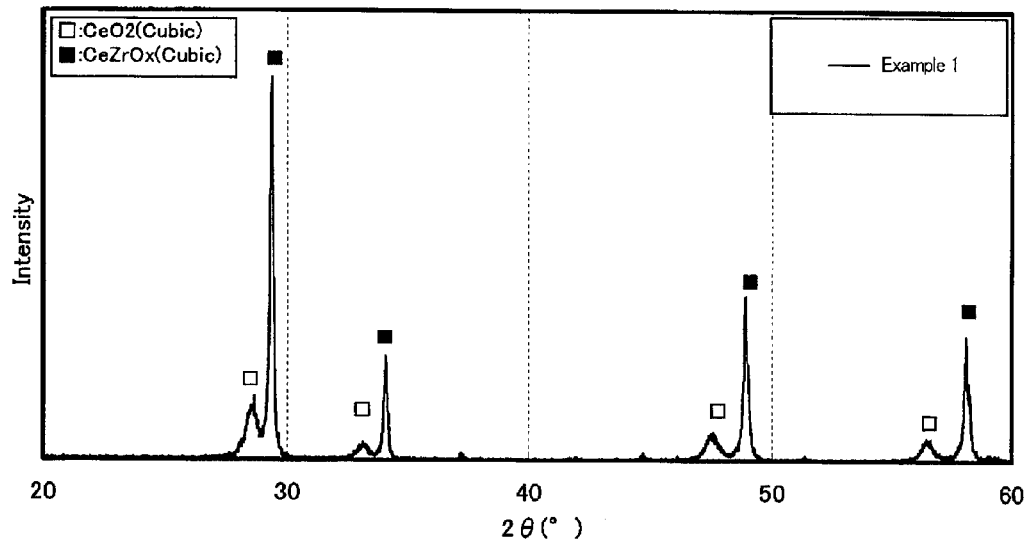
FIG. 1 shows X-ray diffraction results of the oxide powder obtained in Example 1.

Hereinafter, the cerium oxide-zirconium oxide based composite oxide of the present invention and the production method thereof are described in detail. The zirconium oxide (zirconia) referred to in the present invention is a typical zirconia containing 10 wt % or less of impurity metal compounds, including hafnia.

In the present invention, "%" indicates "wt %=mass %," unless otherwise particularly specified.

1. Cerium Oxide-Zirconium Oxide Based Composite Oxide

One of the features of the cerium oxide-zirconium oxide based composite oxide of the present invention is that it comprises "a mixture of (1) a cerium-zirconium composite oxide from a melting process and (2) cerium dioxide from a wet process."

The "cerium-zirconium composite oxide from a melting process" has a crystallite diameter of preferably 50 nm or more, more preferably 80 nm or more, and still more preferably 100 nm or more. The "cerium dioxide from a wet process" has a crystallite diameter of preferably less than 50 nm, more preferably 30 nm or less, and still more preferably 20 nm or less.

Although there is no particular limitation to the upper limit of the crystallite diameter of the "cerium-zirconium composite oxide from a melting process," it is about 300 nm.

Although there is no particular limitation to the lower limit of the crystallite diameter of the "cerium dioxide from a wet process," it is about 1 nm.

In the present invention, there is no particular limitation to the "cerium-zirconium composite oxide from a melting process"; it may be those produced as described in the following manner, or those equivalent to those produced as described in the following manner.

Examples of the "cerium-zirconium composite oxide from a melting process" include those obtained by mixing, at a predetermined ratio, a cerium oxide-containing material (also referred to as a cerium starting material) and a zirconium oxide-containing material (also referred to as a zirconium starting material); melting the resulting starting material mixture at a temperature at or above the melting point; cooling the obtained molten material to form an ingot; optionally grinding the ingot into a powder; then removing the strain within powder crystals under heating; and grinding the resulting product to a finer size.

There is no particular limitation to the cerium starting material, but it is preferably cerium oxide. The cerium oxide may be an oxide produced from nitrate, carbonate, sulfate, acetate, chloride, bromide, or the like. There is also no particular limitation to the zirconium starting material, but it is preferably a zirconium element material containing zirconium oxide, such as baddeleyite, desiliconized zirconia, or zirconium oxide. The zirconium oxide may be an oxide produced from nitrate, carbonate, sulfate, acetate, chloride, bromide, or the like. The cerium starting material and the zirconium starting material may each be a mixture or composite oxide of these materials. There is no particular limitation to the purity of each of the cerium starting material and the zirconium starting material, but it is preferably 99.9% or more.

The above-mentioned cerium starting material and zirconium starting material are mixed at a predetermined ratio, and placed in a melting furnace. The formulation of the zirconium atoms relative to the cerium atoms (zirconium/cerium) in the composite oxide in a molar ratio is preferably within a range of 5/95 to 70/30, more preferably within a range of 20/80 to 65/35, and still more preferably within a range of 40/60 to 60/40. If the ratio is outside the above-mentioned range, desired oxygen storage capacity and heat resistance cannot be obtained.

Thereafter, the starting material mixture is melted in the furnace. There is no particular limitation to the melting method, as long as at least one of the starting materials is melted. Examples of melting methods include an arc-melting method, a high-frequency heat plasma method, and the like. Of these, a general electric melting method, i.e., a melting method that uses an arc electric furnace, is preferably employed.

In a melting method that uses an arc electric furnace, although it varies depending on the mixing ratio of the cerium starting material and the zirconium starting material, a predetermined amount of coke is optionally added as a conductive material to the starting cerium and zirconium material mixture so as to facilitate initial energization. Subsequently, a secondary voltage and an average load power are adjusted to, for example, 70 to 100 V and 80 to 100 kW, respectively, to perform heating at a temperature of, for example, 2,400° C. or higher. The starting materials can be uniformly molten by leaving them to stand for 0.5 to 3 hours after they are in a molten state. Although it is sufficient if the heating temperature is 2,000° C. or higher, the temperature is preferably at or above the melting point of the starting materials, and is particularly preferably 2,600 to 2,800° C. The starting materials in a molten state are left to stand for preferably 1 to 2 hours. There is no particular limitation to the atmosphere during the melting; the melting may be performed in air or in an inert gas atmosphere such as nitrogen, argon, or helium. There is also no particular limitation to the pressure, and it may be ordinary pressure, increased pressure, or reduced pressure. Usually, an atmospheric pressure is applied.

After the completion of the melting, the electric furnace is covered with a carbon lid, and the molten material is slowly cooled over a period of 20 to 30 hours to obtain an ingot. There is no particular limitation to the method for cooling the molten material; usually, the material is removed from the melting furnace and slowly cooled in air to 100° C. or lower, preferably to 50° C. or lower, more preferably to room temperature. Thereby, an ingot of a cerium-zirconium based composite oxide in which the cerium starting material and the zirconium starting material are uniformly mixed can be obtained.

The ingot obtained after the melting is ground. There is no particular limitation to the method for grinding the ingot; the grinding may be performed using a crusher, such as a jaw crusher or a roll crusher. The ingot is preferably ground and classified to a powder of 3 mm or less, further 1 mm or less, to facilitate the handling thereof in the subsequent steps.

The resulting powder is subjected to magnetic separation to remove impurities, etc., and is then optionally placed in an electric furnace, or the like, to remove, by an oxidation heat treatment, suboxides formed during the melting step or strains induced in the crystal due to supercooling. There is no particular limitation to the conditions of the oxidation heat treatment insofar as the ingot or powder is oxidized, but the heat treatment is usually performed at 100 to 1,000° C., preferably 600 to 800° C. There is no limitation to the heat treatment time, and it may be 1 to 5 hours, preferably 1 to 3 hours.

The powder obtained in the manner described above may be further finely ground depending on the application purpose. There is no particular limitation to the method for finely grinding the powder; the grinding may be performed using a grinder, such as a planetary mill, a ball mill, or a jet mill, for 5 to 30 minutes. This fine grinding allows the resulting cerium-zirconium based composite oxide to have an average particle diameter of preferably 0.2 to 10 μm, and more preferably 1.0 to 5.0 μm. Although the detailed reason is unknown, fine grinding is considered to make the surface area of the composite oxide larger, and allows a large amount of oxygen to be released in a low-temperature region.

The "cerium-zirconium composite oxide from a melting process" of the present invention may contain one or more rare earth oxides (excluding cerium oxide). This can be achieved by performing the addition of one or more rare earth oxides (excluding cerium oxide) in the production of "cerium-zirconium composite oxide from a melting process."

Examples of rare earth oxides include oxides of Y and Sc, and oxides of lanthanoids, such as La, Pr, and Nd. The cerium-zirconium composite oxide from a melting process of the present invention may contain preferably 1 to 50%, more preferably 3 to 20%, of one or more of the aforementioned rare earth oxides.

In the present invention, there is no particular limitation to the "cerium dioxide from a wet process"; it may be those produced by adding an alkali to a cerium salt-containing solution to form cerium hydroxide and heating the formed cerium hydroxide, or may be those that are equivalent thereto.

It is certain that the cerium dioxide from a wet process may also be those obtained by a method comprising heating a cerium salt-containing solution containing, for example, urea or the like, to form ammonia to thereby form cerium hydroxide.

If the "cerium-zirconium composite oxide from a melting process" has a crystallite diameter of less than 50 nm, the melting progresses insufficiently, resulting in an unsatisfactory crystallinity. In such a case, the surface energy and the internal energy go off-balance towards the surface energy, which is disadvantageous for the movement of lattice oxygen, and is thus not preferable.

If the "cerium dioxide from a wet process" has a crystallite diameter of 50 nm or greater, the surface energy and internal energy go off-balance towards the internal energy, which functions as a point for releasing oxygen, resulting in insufficient surface activity, and is thus not preferable.

The cerium oxide-zirconium oxide based composite oxide of the present invention has an OSC (600° C.) of preferably 150 μmol/g or more, more preferably 250 μmol/g or more, and still more preferably 280 μmol/g or more.

As used herein, the OSC (600° C.) refers to a value calculated from the amount of the oxygen consumption at 600° C. in the OSC measuring method described below.

An OSC (600° C.) of less than 150 μmol/g is not preferable because such a value is not sufficient for use in an OSC material for an automotive catalyst.

In the cerium oxide-zirconium oxide based composite oxide of the present invention, (1):(2) (a weight ratio) is preferably 20:80 to 99:1, more preferably 50:50 to 90:10, still more preferably to 60:40 to 80:20.

The proportion of the "cerium-zirconium composite oxide from a melting process" being less than 20% is not preferable because the available OSC will be less than 150 µmol/g. The proportion of the "cerium-zirconium composite oxide from a melting process" being more than 99% is also not preferable because the surface activity becomes low, reducing the temperature properties of the OSC.

The cerium oxide-zirconium oxide based composite oxide of the present invention may further contain preferably 1 to 50%, more preferably 3 to 20%, of one or more rare earth oxides (excluding cerium oxide). Examples of rare earth oxides include oxides of Sc and Y, and oxides of the lanthanoids, such as La, Pr, and Nd, with oxides of La, Pr, Nd, and Y being preferable.

As used herein, the phrase "comprising a mixture" in the phrase "comprising a mixture of (1) a cerium-zirconium composite oxide from a melting process and (2) cerium dioxide from a wet process" means that two or more substances are present as a mixture (the "Kojien" dictionary, second edition (revised expanded edition), fourth edition published on Oct. 15, 1979). Examples thereof include a mixture in which the (2) "cerium dioxide from a wet process" is adhering to or covering the (1) cerium-zirconium composite oxide from a melting process, a mixture in which the (2) cerium dioxide from a wet process mediates the (1) cerium-zirconium composite oxide from a melting process, and the like. A mixture having a solid solution portion is also included in the examples.

Figure 3:
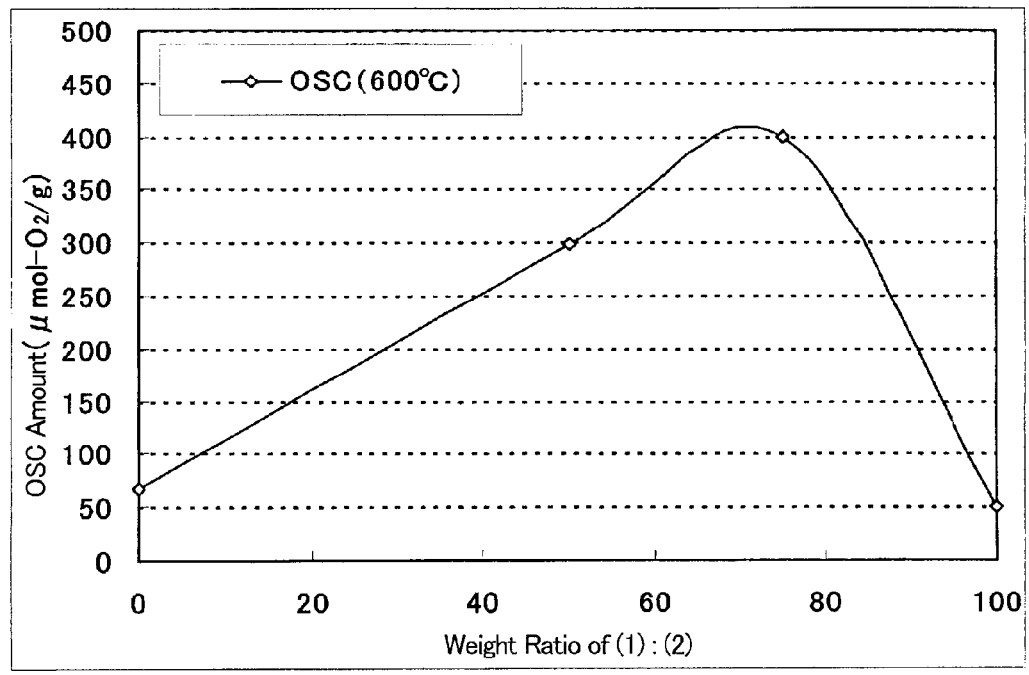
FIG. 3 is a graph showing the OSC measurement results obtained by changing the weight ratio of (1) a cerium-zirconium composite oxide from a melting process to (2) cerium dioxide from a wet process.

FIG. 3 shows changes in the OSC (600° C.) amounts in response to the changes in the weight ratio of the (1) cerium-zirconium composite oxide from a melting process to the (2) cerium dioxide from a wet process.

As is clear from the above, the OSC (600° C.) increases when (1) and (2) are present as a mixture, rather than in a case where either (1) or (2) is present.

This is because when the (1) cerium-zirconium composite oxide from a melting process is present alone, the oxygen on the oxide surface is metastable and the specific surface area is low, and thus a concentration and contact time required to allow an oxidation-reduction reaction to sufficiently proceed on the surface cannot be obtained.

It is considered when, contrary to the above, the surface is covered with the (2) cerium dioxide from a wet process, a three-phase interface comprising (1), (2), and a gas phase is formed, which not only activates the surface oxygen but also achieves the required concentration and contact time, resulting in remarkably high reactivity.

Figure 4:
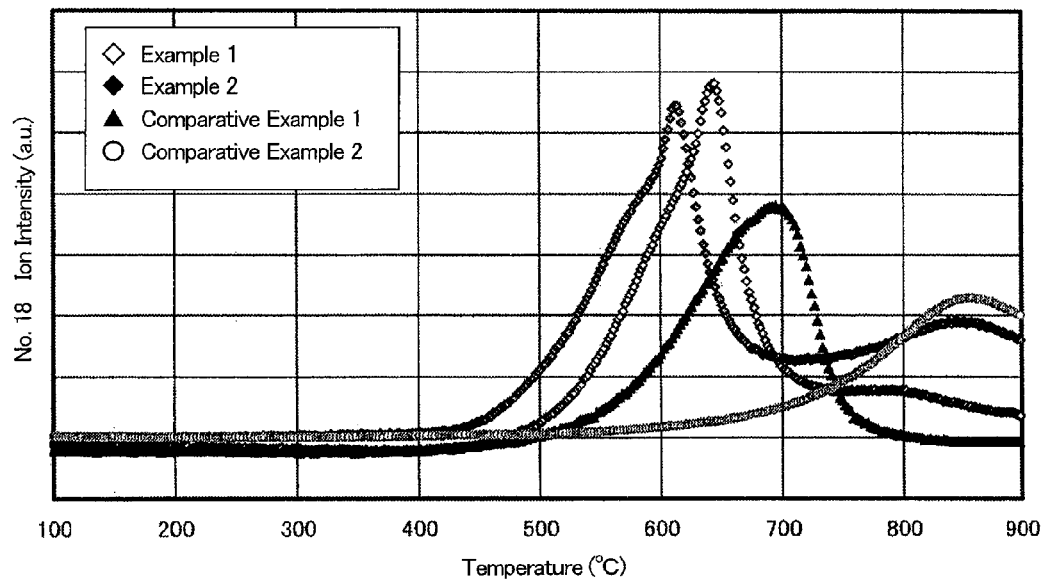
FIG. 4 is a graph showing the measurement results of $H_2$-TPR of the oxide powder obtained in Examples 1 and 2, and Comparative Examples 1 and 2.

FIG. 4 shows the measurement results of $H_2$-TPR in relation to a case where the (1) cerium-zirconium composite oxide from a melting process was used alone, a case where a mixture of the (1) cerium-zirconium composite oxide from a melting process and the (2) cerium dioxide from a wet process was used, and a case where the (2) cerium dioxide from a wet process was used alone.

The above results clarify that when the mixture of (1) and (2) was used, rather than when either (1) or (2) was used, the oxygen desorption from the oxide surface, followed by hydrogen oxidation, is initiated at a lower temperature, allowing lattice oxygen derived from the solid solution of (1) to be consumed. This demonstrates a key feature of the present invention.

The reason for this is considered to be almost the same as described above.

Figure 7:
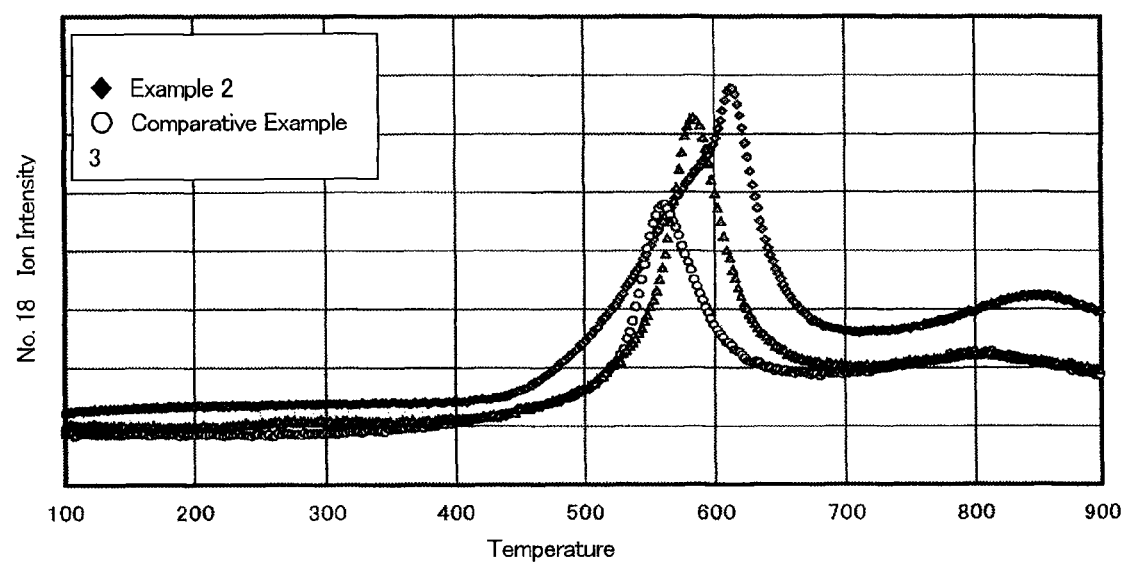
FIG. 7 is a graph showing the measurement results of $H_2$-TPR of the oxide powder obtained in Example 2, and Comparative Examples 3 and 4.

FIG. 7 shows the measurement results of $H_2$-TPR in relation to a case where a mixture of the (1) cerium-zirconium composite oxide from a melting process and the (2) cerium dioxide from a wet process was used, a case where a mixture of cerium dioxide from a wet process and zirconium oxide in which cerium oxide from a wet process is in a solid solution state was used, and a case where a mixture of a cerium-zirconium composite oxide from a wet process and cerium dioxide from a wet process was used.

The above results clarify that when the mixture of the (1) cerium-zirconium composite oxide from a melting process and the (2) cerium dioxide from a wet process is used, the oxygen desorption from the oxide surface, followed by hydrogen oxidation, is initiated at a lower temperature, and a larger OSC (600° C.) is obtained, compared to the cases where a mixture of two components from a wet process was used.

2. Method for Producing Cerium Oxide-Zirconium Oxide Based Composite Oxide

The method for producing a cerium oxide-zirconium oxide based composite oxide of the present invention is characterized in that it comprises dispersing a cerium-zirconium composite oxide from a melting process in a cerium-containing solution, neutralizing the resulting dispersion, and then performing a heat treatment.

The "cerium-zirconium composite oxide from a melting process" has a crystallite diameter of preferably 50 nm or more, more preferably 80 nm or more, and still more preferably 100 nm or more.

Cerium salts may be either cerous salts or ceric salts, and may be those that provide cerium ions, such as cerium sulfate, cerium chloride, and cerium nitrate. These may be used alone, or in a combination.

There is no particular limitation to the concentration of cerium salt, but cerium salt is generally contained as cerium oxide ($CeO_2$) in an amount of 5 to 200 g, particularly 50 to 100 g, per 1,000 g solvent.

The "cerium-zirconium composite oxide from a melting process" that is produced in the above-described manner and that has a molar ratio of the zirconium atoms relative to the cerium atoms (zirconium/cerium) of 5/95 to 70/30, and an average particle diameter of 0.2 to 10 µm, preferably 1.0 to 5.0 µm, is dispersed in the cerium salt solution.

There is no particular limitation to the concentration of the "cerium-zirconium composite oxide from a melting process" in the slurry; however, the content thereof is generally 50 to 500 g, preferably 200 to 400 g, per 1,000 g cerium salt solution.

The "cerium-zirconium composite oxide from a melting process" of the present invention may comprise one or more rare earth oxides (excluding cerium oxide). In such a case, the addition of one or more rare earth oxides (excluding cerium oxide) may be performed during the production of the "cerium-zirconium composite oxide from a melting process."

The "cerium-zirconium based composite oxide" of the present invention may comprise one or more rare earth oxides (excluding cerium oxide). In such a case, the addition of one or more rare earth metal salts (excluding cerium salt) to the cerium-containing solution may be performed in advance.

The alkali used in the present invention is not particularly limited, and, for example, ammonium hydroxide, ammonium bicarbonate, sodium hydroxide, and potassium hydroxide may be used.

There is no particular limitation to the amount of alkali added as long as precipitate can be separated from the aforementioned solution. It is usually sufficient if the aforementioned solution is adjusted to a pH of 9 or more, preferably 11 or more, and more preferably 12 or more. There is no limitation to the upper limit of the pH; it is about 14.

The solution may alternatively be neutralized by allowing the solution to contain, for example, urea or the like, and heating the solution to generate ammonia.

One of the features of the present invention lies in this neutralization process, i.e., neutralizing the solution containing a mixture of two components, the solid "cerium-zirconium composite oxide from a melting process" and ionic cerium salt (cerium ion). Due to such a feature, a "composite hydroxide comprising a mixture of a cerium-zirconium composite oxide from a melting process and cerium hydroxide from a wet process" can be obtained.

After the completion of the neutralization reaction, it is preferable that the solution containing the "composite hydroxide comprising a mixture of a cerium-zirconium composite oxide from a melting process and cerium hydroxide from a wet process" be maintained at 35 to 60° C. for 1 hour or more, preferably 1 to 3 hours, because this allows the resulting precipitate to age, making filtration easier.

Thereafter, the resulting precipitate comprising the "composite hydroxide comprising a mixture of a cerium-zirconium composite oxide from a melting process and cerium hydroxide from a wet process" is collected by a solid-liquid separation method. The solid-liquid separation method may be performed by, for example, a known method, such as filtration, centrifugal separation, or decantation. After the collection, the "composite hydroxide comprising a mixture of a cerium-zirconium composite oxide from a melting process and cerium hydroxide from a wet process" is preferably washed with water to remove the impurities adhering thereto, as required.

The obtained "composite hydroxide comprising a mixture of a cerium-zirconium composite oxide from a melting process and cerium hydroxide from a wet process" may further be dried, if necessary. Drying may be performed by a well-known method, such as air drying or drying by heating. If necessary, a grinding treatment, classifying processing, etc., may be conducted after drying.

Subsequently, the "composite hydroxide comprising a mixture of a cerium-zirconium composite oxide from a melting process and cerium hydroxide from a wet process" obtained in the neutralization process is heated to thereby produce a "cerium oxide-zirconium oxide based composite oxide comprising a mixture of (1) a cerium-zirconium composite oxide from a melting process and (2) cerium dioxide from a wet process."

The "cerium dioxide from a wet process" has a crystallite diameter of preferably less than 50 nm, more preferably 30 nm or less, and still more preferably 20 nm or less.

The heat treatment temperature is not particularly limited. Usually, the heating is performed at about 400 to 900° C. for 1 to 5 hours. The heat treatment atmosphere is not particularly limited, and the heating is usually performed in air or in an oxidizing atmosphere.

The thus-obtained composite oxide can be ground, if necessary. The grinding method is not particularly limited, and grinding is usually performed using a grinder, such as a planetary mill, a ball mill, or a jet mill.

EXAMPLES

The present invention is described in detail below with reference to Examples. However, the scope of the present invention is not limited to these Examples.

Each physical property in the Examples was measured by the following procedures.

(1) Average Particle Diameter (D50)

Average particle diameter was measured using a laser diffraction/scattering analyzer (LA-950, produced by HORIBA, Ltd.).

In this invention, the average particle diameter (D50) refers to a particle diameter where the cumulative frequency of the measured particle size distribution is equal to 50 volume %.

(2) Specific Surface Area (SSA)

Specific surface area was measured according to a BET method using a specific surface area measuring instrument (FlowSorb II, produced by Micromeritics Corp.).

(3) $H_2$-TPR $H_2$-TPR was measured by temperature-programmed reduction (BEL JAPAN INC., MULTITASK T.P.R.).

More specifically, 0.1 g of powder was heated to 300° C., and maintained in high-purity oxygen gas for 60 minutes to be thoroughly oxidized. The resulting product was heated from 100° C. at a heating rate of 10° C./min to 900° C. under a flow of a 5% hydrogen-argon gas mixture (100 sccm). The hydrogen consumed during this process was continuously measured using a quadrupole mass spectrometer; thereby, water vapor generation curves ($H_2$-TPR) associated with the increase in temperature were obtained.

(4) Oxygen Storage Capacity (OSC (600° C.))

OSC is expressed in $\mu mol\text{-}O_2/g$, i.e., an oxygen storage capacity per unit weight of powder. First, 0.50 g of powder was subjected to a reduction treatment at 600° C. for 10 minutes under a flow of a 5% hydrogen-argon gas mixture. Next, oxygen gas was pulse-injected (0.5 mL per 0.1 sec.), and the oxygen gas concentration at the outlet was detected by gas chromatography (GC-8A, produced by Shimadzu Co., Ltd.). More specifically, oxygen desorption was carried out at 600° C. under 5% $H_2$ gas, the amount of oxygen occluded (consumed) as a result of the oxygen pulse injection was measured; and the amount of the oxygen consumption at 600° C. was considered as the OSC (600° C.)

(5) Crystallite Diameter

The crystallite diameter of $CeO_2$ or $CeZrO_4$ was calculated by X-Ray Diffraction (XRD) analysis using an automatic X-ray diffractometer. A Cu target was used as an X-ray source, and the measurement was performed in a range of $20°\leq 2\theta \leq 60°$. Based on the peak values of $2\theta = 28.6°, 29.3°$, the crystallite diameters were calculated using the Scherrer method.

Production of Cerium-Zirconium Composite Oxide from a Melting Process

By using high-purity zirconium oxide (purity: 99.9%) as a starting material of Zr, and high-purity cerium oxide (purity: 99.9%) as a starting material of Ce, a cerium-zirconium composite oxide powder from a melting process was produced in accordance with the procedures described below.

First, in order to produce 10 kg of a powder, the high-purity zirconium oxide (4.2 kg) and the high-purity cerium oxide (5.8 kg) were mixed, and the mixture was molten in an arc electric furnace at 2,200° C. or more at a secondary voltage of 85 V at an average load power of 99.5 kW for an energization time of 1 hour 50 minutes with a total electric energy of 182 kWh.

In order to facilitate the initial energization, 500 g of coke was used. After the completion of melting, the electric furnace was covered with a carbon lid, and the molten mixture was slowly cooled in air over a period of 24 hours to obtain an ingot. The obtained ingot was ground to 3 mm or less using a jaw crusher and a roll crusher, and then sieved to collect a powder of 1 mm or less.

Subsequently, the collected powder was fired in air in an electric furnace at 800° C. for 3 hours to remove the suboxides formed during the melting step and strains induced in the crystals due to undercooling, and was then ground using a jet mill to obtain a powder having an average particle diameter of 2.35 μm. The crystallite diameter was 200 nm.

In the present invention, the "cerium-zirconium composite oxide" is equal to the "cerium oxide-zirconium oxide composite oxide," and is also equal to the "zirconium oxide in which cerium oxide is in a solid solution state"; they are sometimes simply referred to as "CZ."

Example 1

Production of CZ from a Melting Process: $CeO_2$ from a Wet Process=75:25 (Weight Ratio)

210 g of the cerium-zirconium composite oxide from a melting process produced above was added to 350 g (70 g as the amount of $CeO_2$) of a 20% cerous nitrate solution, thereby obtaining a slurry containing the cerium-zirconium composite oxide from a melting process.

Thereafter, this solution was neutralized with 250 g of 25% aqueous ammonia. The pH at this time was 9.3. Subsequently, this solution was heated to 50° C. and maintained for 1 hour. Afterward, filtration and washing with water were carried out to obtain a hydroxide.

The obtained hydroxide was fired at 700° C. in air for 5 hours to obtain an oxide.

The obtained oxide was ground to 20 μm or less. Thereafter, D50, SSA (a specific surface area), the crystallite diameter of $CeO_2$, the crystallite diameter of CZ, OSC (600° C.), etc., shown in Table 1 were measured.

FIG. 1 shows the results of X-ray diffraction of the obtained oxide powder.

Example 2

Production of CZ from a Melting Process: $CeO_2$ from a Wet Process=50:50 (Weight Ratio)

The same procedure was performed as described in Example 1, except that the amount of the cerium-zirconium composite oxide from a melting process was changed to 70 g.

The obtained oxide was ground to 20 μm or less; afterward, D50, SSA, the crystallite diameter of $CeO_2$, the crystallite diameter of CZ, OSC (600° C.), etc., shown in Tables 1 and 2 were measured.

Figure 2:
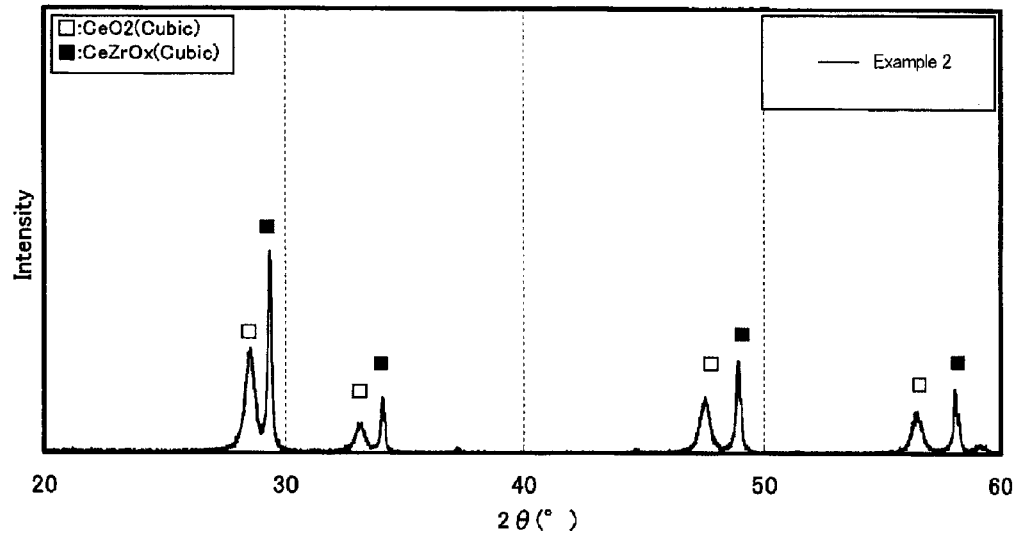
FIG. 2 shows X-ray diffraction results of the oxide powder obtained in Example 2.

FIG. 2 shows the results of the X-ray diffraction of the obtained oxide powder.

Comparative Example 1

The cerium-zirconium composite oxide from a melting process obtained above after firing at 700° C. for 5 hours was used as is. With respect thereto, D50, SSA, the crystallite diameter of CZ, OSC (600° C.), etc., shown in Table 1 were measured as in Example 1.

Comparative Example 2

986 g of pure water, 30.3 g of nitric acid (100% basis), and 600 g of urea (8.4 times the amount required to give cerium hydroxide) were added to 412.5 g (100 g as the amount of $CeO_2$) of a cerium (IV) nitrate solution.

The resulting product was heated to 97° C., maintained for 3 hours, and neutralized to form cerium hydroxide. The resulting slurry was filtered and then washed with water, thereby obtaining a hydroxide.

This hydroxide was fired at 700° C. for 10 hours to obtain a cerium dioxide powder. Using this powder, D50, SSA, the crystallite diameter of $CeO_2$, OSC (600° C.), etc., shown in Table 1 were measured as in Example 1.

TABLE 1

|  | Unit | Ex. 1 | Ex. 2 | Comp. Ex. 1 | Comp. Ex. 2 |
|---|---|---|---|---|---|
| $ZrO_2$ | % | 32.8 | 21.8 | 42 | — |
| $CeO_2$ | % | 67.2 | 78.2 | 58 | 100 |
| D50 | μm | 4.57 | 10.3 | 10.2 | 4.73 |
| SSA | m²/g | 10.9 | 19.5 | 0.8 | 69.8 |
| Crystallite Diameter of $CeO_2$ | nm | 15 | 20 | — | 13 |
| Crystallite Diameter of CZ | nm | 109 | 102 | 200 | — |
| OSC (600° C.) | μmol-$O_2$/g | 400 | 298 | 50 | 67 |

FIGS. 1 and 2 confirm that a cerium oxide-zirconium oxide based composite oxide "comprising a mixture of (1) a cerium-zirconium composite oxide from a melting process and (2) cerium dioxide from a wet process" was obtained.

The crystallite diameters of Examples 1 and 2 were about ½ that of the original (Comparative Example 1). Although a clear reason for this is unknown, it is considered that because single coarse crystals, i.e., the "cerium-zirconium composite oxide from a melting process" and the "cerium dioxide from a wet process," were ground after they were mixed, the coarse crystals were broken into small pieces, resulting in apparently small crystallite diameter.

Regarding the OSC, the activation in two aspects is considered important: one of the aspects being the reaction between oxidation molecules and reduction molecules on the particle surface (referred to as "reaction process"), and the other aspect being migration and immobilization of oxygen, i.e., lattice oxygen, within the particle (hereinafter referred to as "migration process"). In consideration of the migration process, when the particle has a good crystallinity (Zr is fully inserted into Ce backbone) and a large crystallite diameter, the activation can be enhanced; however, such activation makes the particle surface inactive in the reaction process and limits the temperature at which the lattice oxygen can be used to a high degree. The reason thereof in detail is considered to be mainly because the reaction field (reaction cross section) is reduced as a result of a reduction in the specific surface area.

To address the trade-off regarding the above-mentioned activation, a dual structure is employed in the present invention to simultaneously achieve the opposing effects, i.e., the temperature of lattice oxygen-migration energies is reduced, and the reaction field is ensured. This enables the use of the OSC of an OSC material without limiting the temperature to a high temperature.

Comparative Example 3

Equivalent to Example 1 of Japanese Unexamined Patent Publication No. 2008-013423

280 g (56 g as the amount of $CeO_2$) of a 20% cerous nitrate solution was heated to 85° C., followed by the addition of 624 g (156 g as the amount of $Na_2SO_4$) of a 25% sodium sulfate solution. The resulting product was maintained at 85° C. for 1 hour, thereby obtaining a sodium cerous sulfate double salt-containing slurry.

110 g (22 g as the amount of $ZrO_2$) of a 20% zirconium nitrate solution and 110 g (22 g as the amount of $CeO_2$) of a 20% cerous nitrate solution were added to the resulting basic cerium sulfate-containing slurry.

The resulting solution was then neutralized using 500 g of 25% sodium hydroxide. The pH at this time was 12 or higher. Subsequently, filtration and washing with water were carried out, thereby obtaining a hydroxide.

The obtained hydroxide was then fired in air at 650° C. for 5 hours to obtain an oxide.

As a result, a composite oxide "comprising a mixture of cerium dioxide from a wet process and zirconium oxide in which cerium oxide from a wet process is in a solid solution state" was produced.

Figure 5:
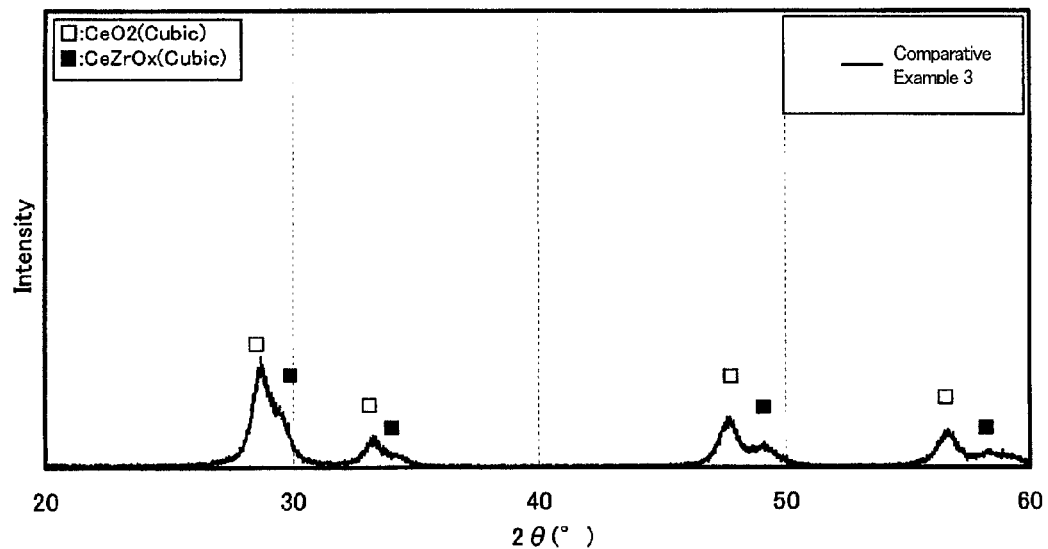
FIG. 5 shows X-ray diffraction results of the oxide powder obtained in Comparative Example 3.

FIG. 5 shows the X-ray diffraction results of the obtained oxide.

With respect to this powder, D50, SSA, the crystallite diameter of $CeO_2$, the crystallite diameter of CZ, OSC (600° C.), etc., shown in Table 2 were measured as described in Example 1.

Comparative Example 4

Production of Cerium-Zirconium Composite Oxide from a Wet Process 141 g of a 25% sodium sulfate solution was heated to 85° C. Then, 375 g of a zirconium oxychloride solution containing 16% of $ZrO_2$ equivalent, previously heated to 85° C., was added thereto. Thereafter, hydrochloric acid was added so that the free acid concentration became 1.5; N, and the resulting product was maintained for 0.5 hour to form basic zirconium sulfate.

The thus-obtained reaction solution was heated to 95° C. and then maintained for 0.5 hour for aging. Subsequently, the aged solution was cooled to room temperature, and 414 g of a cerium nitrate solution (20% on $CeO_2$ basis) was added thereto and uniformly mixed. Then, 25% sodium hydroxide was added to the obtained mixed solution, and the mixture was neutralized to a pH of 13 or higher to form a hydroxide precipitate. The obtained hydroxide precipitate was filtrated and sufficiently washed with water. After washing with water, the hydroxide was fired in air at 600° C. for 5 hours, and the obtained oxide was ground to 20 μm or less to obtain a cerium zirconium composite oxide from a wet process.

Production of CZ from a Wet Process: $CeO_2$ from a Wet Process=50:50 (Weight Ratio)

The cerium-zirconium composite oxide from a wet process obtained above was ground to an average particle diameter of 2.0 μm. Then, 70 g of the resulting particles were added to 350 g (70 g as the amount of $CeO_2$) of a 20% cerous nitrate solution to obtain a slurry containing the cerium-zirconium composite oxide from a wet process.

The resulting solution was neutralized with 250 g of 25% aqueous ammonia. The pH at this time was 10.0. Thereafter, this solution was heated to 50° C. and maintained for 1 hour. Subsequently, filtration and washing with water were carried out, thereby obtaining a hydroxide.

The obtained hydroxide was fired at 700° C. in air for 5 hours to obtain an oxide.

Consequently, a composite oxide "comprising a mixture of a cerium-zirconium composite oxide from a wet process and cerium dioxide from a wet process" was produced.

Figure 6:
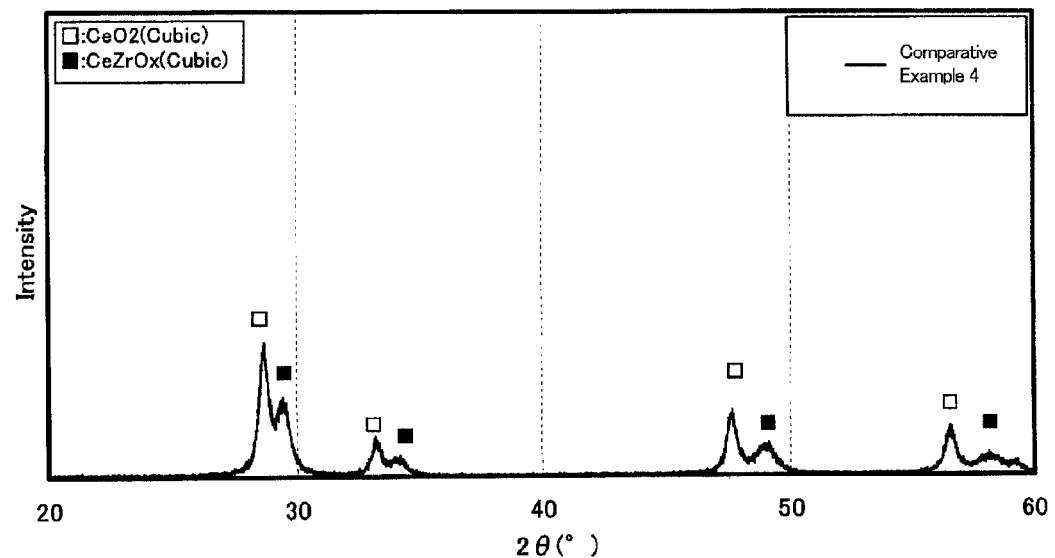
FIG. 6 shows X-ray diffraction results of the oxide powder obtained in Comparative Example 4.

FIG. 6 shows the X-ray diffraction results of the obtained oxide.

Using this powder, the D50, SSA, the crystallite diameter of $CeO_2$, the crystallite diameter of CZ, OSC (600° C.), etc., shown in Table 2 were measured as described in Example 1.

TABLE 2

|  | Unit | Ex. 2 | Comp. Ex. 3 | Comp. Ex. 4 |
|---|---|---|---|---|
| $ZrO_2$ | % | 21.8 | 23.2 | 24.8 |
| $CeO_2$ | % | 78.2 | 76.8 | 75.2 |
| D50 | μm | 10.3 | 3.30 | 10.8 |
| SSA | $m^2/g$ | 19.5 | 67.8 | 49.1 |
| Crystallite Diameter of $CeO_2$ | nm | 20 | 10 | 20 |
| Crystallite Diameter of CZ | nm | 102 | 17 | 14 |
| OSC (600° C.) | $\mu mol$-$O_2/g$ | 298 | 250 | 220 |

Table 2 clarifies that when the composition ratio is almost the same, a case where a mixture of the (1) cerium-zirconium composite oxide from a melting process and the (2) cerium dioxide from a wet process of the present invention achieved higher OSC (600° C.), compared to cases where a mixture of two products both from a wet process was used (Comparative Examples 3 and 4).

The invention claimed is:

1. A cerium oxide-zirconium oxide based composite oxide comprising a mixture of (1) a cerium-zirconium composite oxide from a melting process and (2) cerium dioxide from a wet process,
   wherein the cerium-zirconium composite oxide from the melting process in the cerium oxide-zirconium oxide based composite oxide has a crystallite diameter of 102 nm or greater,
   the cerium dioxide from the wet process in the cerium oxide-zirconium oxide based composite oxide has a crystallite diameter of less than 50 nm; and
   the cerium oxide-zirconium oxide based composite oxide has a weight ratio of (1):(2) of 20:80 to 99:1;
   the melting process comprises:
   mixing a cerium oxide-containing material and a zirconium oxide-containing material to form a mixture,
   melting the mixture at a temperature at or above the melting point, and
   cooling the molten material; and
   the wet process comprises:
   adding an alkali to a cerium salt-containing solution to form cerium hydroxide, and
   heating the formed cerium hydroxide.

2. The cerium oxide-zirconium oxide based composite oxide according to claim 1, which has an OSC (600° C.) of 150 μmol/g or more.

3. The cerium oxide-zirconium oxide based composite oxide according to claim 1, wherein the cerium-zirconium composite oxide from a melting process contains one or more rare earth oxides other than cerium oxide.

4. The cerium oxide-zirconium oxide based composite oxide according to claim 1, which contains one or more rare earth oxides other than cerium oxide.

5. A method for producing a cerium oxide-zirconium oxide based composite oxide, the method comprising:
   dispersing a cerium-zirconium composite oxide of claim 1 from a melting process in a cerium-containing solution;
   neutralizing the resulting dispersion; and then
   performing a heat treatment.

6. The method for producing a cerium oxide-zirconium oxide based composite oxide according to claim 5, wherein the cerium-containing solution contains one or more rare earth metal salts other than cerium salt.

7. The method for producing a cerium oxide-zirconium oxide based composite oxide according to claim 5 or 6, wherein the cerium-zirconium composite oxide from a melting process contains one or more rare earth oxides other than cerium oxide.

8. The cerium oxide-zirconium oxide based composite oxide according to claim 1, wherein the melting process further comprises:
   grinding the cooled material to form a powder; and
   heating the powder to remove strain within powder crystals.

9. The cerium oxide-zirconium oxide based composite oxide according to claim 1, wherein the wet process comprises:
   heating a cerium salt-containing solution to form ammonia and cerium hydroxide; and
   heating the cerium hydroxide to form cerium oxide.

10. The cerium oxide-zirconium oxide based composite oxide according to claim 9, wherein the heating a cerium salt-containing solution is in the presence of urea.

\* \* \* \* \*